United States Patent
Wilburn et al.

(10) Patent No.: US 7,338,708 B2
(45) Date of Patent: Mar. 4, 2008

(54) THICK SHRINK FILM HAVING HIGH OXYGEN TRANSMISSION RATE

(75) Inventors: Daniel S. Wilburn, Woodruff, SC (US); Clifford A. Kendrick, Greenville, SC (US)

(73) Assignee: Cryovac, Inc., Duncan, SC (US)

( * ) Notice: Subject to any disclaimer, the term of this patent is extended or adjusted under 35 U.S.C. 154(b) by 496 days.

(21) Appl. No.: 10/379,784

(22) Filed: Mar. 5, 2003

(65) Prior Publication Data

US 2004/0175518 A1 Sep. 9, 2004

(51) Int. Cl.
*B32B 7/12* (2006.01)
*B32B 15/04* (2006.01)

(52) U.S. Cl. .................. 428/349; 428/500; 428/347; 428/35.7; 428/220; 428/35.2; 428/523

(58) Field of Classification Search .............. 428/35.7, 428/349, 500, 347, 220, 35.2, 523
See application file for complete search history.

(56) References Cited

U.S. PATENT DOCUMENTS 3,835,618 A 9/1974 Perdue (Continued)

FOREIGN PATENT DOCUMENTS

EP 0308106 A2 * 3/1989

(Continued)

OTHER PUBLICATIONS

Journal of Polymer Science: Polymer Physics Edition, vol. 20, pp. 441-455 (1982) "Determination of Branching Distributions in Polyethylene and Ethylene Copolymers".

(Continued)

*Primary Examiner*—Michael Miggins
(74) *Attorney, Agent, or Firm*—Rupert B. Hurley Jr.

(57) ABSTRACT

A multilayer film is relatively thick has an oxygen transmission rate of at least 10,000 cc/mil/24 hour@STP. The film is particularly suited for the packaging of fresh seafood. The film has a first layer which is an outer film layer which serves as a heat seal layer, and a second layer which serves as a high $O_2$-transmission layer. The first layer has a thickness of from 2 to 20 percent of a total thickness of the multilayer film. The second layer comprises at least one member selected from the group consisting of: (i) ethylene/butyl acrylate copolymer, (ii) homogeneous ethylene/alpha-olefin copolymer having a density of from 0.86 to 0.91 g/cc; (iii) heterogeneous ethylene/alpha-olefin copolymer having a density of from 0.89 to 0.91 g/cc; (iv) ethylene/methyl acrylate copolymer having a methyl acrylate mer content of from 20 to 24 mole percent; (v) ethylene/vinyl acetate copolymer having a vinyl acetate mer content of from 10 to 30 mole percent; and (vi) styrene butadiene block copolymer. The at least one second layer having a thickness of from 80 to 98 percent of the total thickness of the multilayer film. The film is at least 1.5 mils thick. The invention also pertains to a bag made from the film, as well as a packaged product utilizing the film.

21 Claims, 4 Drawing Sheets

U.S. PATENT DOCUMENTS

| | | | |
|---|---|---|---|
| 4,278,738 A | 7/1981 | Brax et al. | |
| 4,302,565 A | 11/1981 | Goeke et al. | |
| 4,302,566 A | 11/1981 | Karol et al. | |
| 4,833,024 A | 5/1989 | Mueller | |
| 4,865,902 A | 9/1989 | Golike et al. | |
| 5,023,143 A | 6/1991 | Nelson | |
| 5,183,706 A * | 2/1993 | Bekele | 428/349 |
| 5,206,075 A | 4/1993 | Hodgson, Jr. | |
| 5,241,031 A | 8/1993 | Mehta | |
| 5,272,236 A | 12/1993 | Lai et al. | |
| 5,278,272 A | 1/1994 | Lai et al. | |
| 5,332,616 A * | 7/1994 | Patrick et al. | 428/218 |
| 5,491,019 A | 2/1996 | Kuo | |
| 5,638,660 A * | 6/1997 | Kuo | 53/449 |
| 6,042,913 A | 3/2000 | Miranda et al. | |
| 6,670,023 B2 | 12/2003 | Mueller | |

FOREIGN PATENT DOCUMENTS

| | | |
|---|---|---|
| EP | 0 690 012 | 3/1996 |
| EP | 0 713 766 | 5/1996 |
| EP | 0 844 078 | 5/1998 |
| EP | 0 905 041 | 3/1999 |
| WO | WO 90/03414 | 5/1990 |
| WO | WO 97/13640 | 4/1997 |
| WO | 00/66432 | 11/2000 |

OTHER PUBLICATIONS

"Permeability And Other Film Properties of Plastics and Elastomers", Copyright 1995, Plastics Design Library, Title Page and copyright page; Chapter 41 title page and Table 209; Chapter 68 title page and Tables 327 and 352; Chapter 69 title page and Tables 330 and 331; Chapter 74 title page and Table 351 (1995).

"Gas Permeability of KRATON™ Polymers—Fact Sheet K0102", pp. 1-4 (Aug. 2001).

FDA Issues VAC/MAP Import Alert #16-125, pp. 1-5 (Sep. 25, 2002).

* cited by examiner

THICK SHRINK FILM HAVING HIGH OXYGEN TRANSMISSION RATE

FIELD OF THE INVENTION

The present invention pertains to the field of films, particularly flexible packaging films, more particularly to films suited for the packaging of products which benefit from being packaged in a film exhibiting a high oxygen transmission rate, such as seafood.

BACKGROUND OF THE INVENTION

In the packaging of fresh seafood, if the packaging material does not have a relatively high oxygen transmission rate ("OTR"), under certain conditions the result can be the growth of clostridiyum botulinum, which can produce illness for a consumer of the seafood. Recently the United States Food and Drug Administration set a new standard for the packaging of seafood because of the risk of growth of clostridiyum botulinum. Under the new standard, the packaging film must have an oxygen (i.e., $O_2$) transmission rate of at least 10,000 $cc/m^2/24$ hr at @STP (i.e., at standard temperature, pressure, and relative humidity, which are 73° F., 0% relative humidity, and atmospheric pressure at sea level).

Previously, packaging films having oxygen transmission rates of from 2,000 to 5,000 $cc/m^2/24$ hr at @STP have been used for the packaging of seafood. However, with the new 10,000 $cc/m^2/24$ hr at @STP requirement, these films have too low an oxygen transmission rate to meet the new FDA oxygen transmission rate for packaging seafood.

Films exhibiting a relatively high oxygen transmission rate have for some time been used for the packaging of various food products such as fresh produce, fruit, and cheese. Gas transmission rates for the packaging of these foods have traditionally been tailored to a desired level by making a relatively thin film (thickness generally in the range of from about 1 mil to about 1¼ mil) which contains at least one polymer having a relatively high oxygen transmission rate. In general, produce need not be packaged in a film having high abuse-resistance. Thus, the 1 mil to 1¼ mil produce high OTR film have provided good performance for the packaging of produce.

The packaging of seafood in a film having the desired oxygen transmission rate is rendered problematic by the opposing requirements of a film having both a high OTR and high abuse-resistance. Seafood packaging films require a more abuse-resistant film than produce does. Thickening the 1 mil to 1¼ mil produce films to provide the desired abuse-resistance results in a film having an OTR too low to be suitable for the packaging of seafood.

It would be desirable to provide a film exhibiting a combination of higher abuse-resistance than produce films while at the same time providing the film with a relatively high oxygen transmission for the packaging of fresh seafood. If such a film is available, fresh seafood which is packaged in the film could be quickly chilled by being placed in a low-temperature brine solution, resulting in a product with longer shelf life and higher quality when reaching the consumer.

SUMMARY OF THE INVENTION

A film has been discovered which has a heretofore unachieved combination of oxygen transmission rate and thickness, with the relatively high thickness providing the film with higher abuse-resistance than thinner films of the same polymeric composition. The film of the invention can be designed to provide an oxygen transmission rate of at least 10,000 $cc/m^2/day$ @STP in combination with an overall thickness of at least 1.5 mils, even 2 mils or more. It has been discovered that this result can be achieved with a multilayer film having relatively thin outer layers and one or more relatively thick inner film layer(s) containing one or more polymers having a particularly high OTR.

As a first aspect, the present invention is directed to a multilayer film comprising a first layer which is a first outer film layer and which serves as a heat seal layer, and at least one second layer which serves as a high oxygen transmission layer. The first layer comprises a first polymer, and has a thickness of from 2 to 20 percent of a total thickness of the multilayer film. The at least one second layer consists essentially of at least one member selected from the group consisting of: (i) ethylene/butyl acrylate copolymer, (ii) homogeneous ethylene/alpha-olefin copolymer having a density less than 0.92 g/cc, (iii) ethylene/methyl acrylate copolymer having a methyl acrylate mer content of from 20 to 24 mole percent, and (iv) ethylene/vinyl acetate copolymer having a vinyl acetate mer content of from 10 to 30 mole percent, and (v) styrene butadiene block copolymer (especially styrene ethylene butadiene block copolymer). The second layer has a thickness of from 80 to 98 percent of the total thickness of the multilayer film. The multilayer film has a total thickness of at least 1.5 mils.

As a second aspect, the present invention is directed to a multilayer film comprising a first layer which is a first outer film layer and which serves as a heat seal layer, and at least one second layer which serves as a high oxygen transmission layer. The first layer comprises a first polymer, and has a thickness of from 2 to 20 percent of a total thickness of the multilayer film. The at least one second layer comprising at least one member selected from the group consisting of: (i) ethylene/butyl acrylate copolymer, (ii) homogeneous ethylene/alpha-olefin copolymer having a density of from 0.86 to 0.91 g/cc, (iii) heterogeneous ethylene/alpha-olefin copolymer having a density of from 0.89 to 0.91 g/cc, (iv) ethylene/methyl acrylate copolymer having a methyl acrylate mer content of from 20 to 24 mole percent; and (v) ethylene/vinyl acetate copolymer having a vinyl acetate mer content of from 10 to 30 mole percent, and (vi) styrene butadiene block copolymer. The at least one second layer has a thickness of from 80 to 98 percent of the total thickness of the multilayer film. The total thickness of the multilayer film is at least 1.5 mils, and the film has an oxygen transmission rate of at least 10,000 $cc/m^2$ hr @STP.

In a preferred embodiment in accordance of the first or second aspects of the invention, the multilayer film further comprises a third layer which is a second outer film layer, with the at least one second layer being between the first layer and the third layer, with the at least one second layer making up from 85 to 95 percent of the total film thickness, and with the first and third layers together making up from 5 to 15 percent of the total film thickness. More preferably, the at least one second layer makes up from 90 to 95 percent of the total film thickness, with the first and third layers together making up from 5 to 10 percent of the total film thickness.

Preferably, the at least one second layer comprises a plurality of layers each of which comprises ethylene/butyl acrylate copolymer.

Preferably, the multilayer film has a total film thickness of from 1.5 to 10 mils, more preferably from 1.5 to 3 mils, more preferably from 1.5 to 2.5 mils, more preferably from 1.8 to 2.5 mils, and more preferably from 1.8 to 2.2 mils.

In one embodiment of the film of the present invention, the film is especially suited for use in a shrink bag. This multilayer film has a total free shrink at 185° F. (i.e., the free shrink in the longitudinal direction plus the free shrink in the transverse direction, i.e. "L+T" free shrink) of from 20% to 120%, with the free shrink in each direction being measured in accordance with ASTM D2732. This film is preferably produced by the downward casting, trapped bubble biaxial orientation process illustrated in FIG. 1, in conjunction with the accompanying description below. More preferably, this film has a total free shrink of from 15% to 120%, more preferably from 30% to 120%, more preferably from 50% to 115%, more preferably from 80% to 110%, more preferably from 95% to 105%.

In another embodiment of the present invention, the film is especially suited for use as a top web in a vacuum skin packaging (i.e., "VSP"). This film has a total free shrink at 185° F. of from 0 to 10%, as is preferably produced by the hot blown film process illustrated in FIG. 6, in conjunction with the accompanying description below. Preferably, every layer of this film is irradiated to a level of from 50 to 250 kGy, more preferably from 115 to 235 kGy, more preferably from 180 to 220 kGy.

Preferably, the multilayer film has an $O_2$-transmission rate of at least 3,000 $cc/m^2/24$ hr @STP; more preferably, from 3,000 to 55,000; more preferably from 3,000 to 30,000; more preferably, from 5,000 to 20,000; more preferably, from 5,000 to 15,000; more preferably, from 10,000 to 15,000; more preferably, from 10,000 to 12,000.

Preferably, the first outer layer comprises at least one member selected from the group consisting of homogeneous ethylene/alpha-olefin copolymer, heterogeneous ethylene/alpha-olefin copolymer, high density polyethylene, low density polyethylene, ionomer resin, ethylene/unsaturated ester copolymer, and ethylene/unsaturated acid copolymer.

Preferably, the third layer comprises at least one member selected from the group consisting of homogeneous ethylene/alpha-olefin copolymer, heterogeneous ethylene/alpha-olefin copolymer, high density polyethylene, low density polyethylene, ionomer resin, ethylene/unsaturated ester copolymer (particularly ethylene/butyl acrylate copolymer), and ethylene/unsaturated acid copolymer. Optionally, at least one second layer can be oil-filled (e.g., with mineral oil), which has been found to increase the oxygen transmission rate of the layer.

Preferably, at least one layer of the multilayer film comprises a polymer network which has been crosslinked by irradiation. In non-heat-shrinkable films in accordance with the present invention, it is preferred that every layer of the multilayer film comprises a polymer network which has been crosslinked by irradiation.

As a third aspect, the present invention is directed to a heat-shrinkable bag, comprising a multilayer film heat sealed to itself or another film. The multilayer film can be in accordance with the first or second aspects of the present invention. Preferably, the bag exhibits a parallel plate burst strength of at least 30 inches of water, more preferably, from 30 to 100 inches of water, more preferably, from 50 to 90 inches of water, more preferably, from 60 to 80 inches of water. The Parallel Plate Burst Test was carried out by confining the bag (made from the multilayer film in accordance with the first or second aspects of the present invention) between two rigid steel plates spaced 4 inches apart, followed by inflating the bag until it ruptured. The pressure level inside the bag at the point of rupture was considered to be a measure of seal quality. Results are generally reported in inches of water pressure (IOWP). In one preferred embodiment, the bag is an end-seal bag; in another, a side-seal bag.

As a fourth aspect, the present invention is directed to a packaged product comprising: (A) a product comprising seafood, and (B) a package surrounding the product. The package comprises a multilayer film in accordance with the first or second aspects of the present invention.

DETAILED DESCRIPTION OF THE INVENTION

Figure 1:
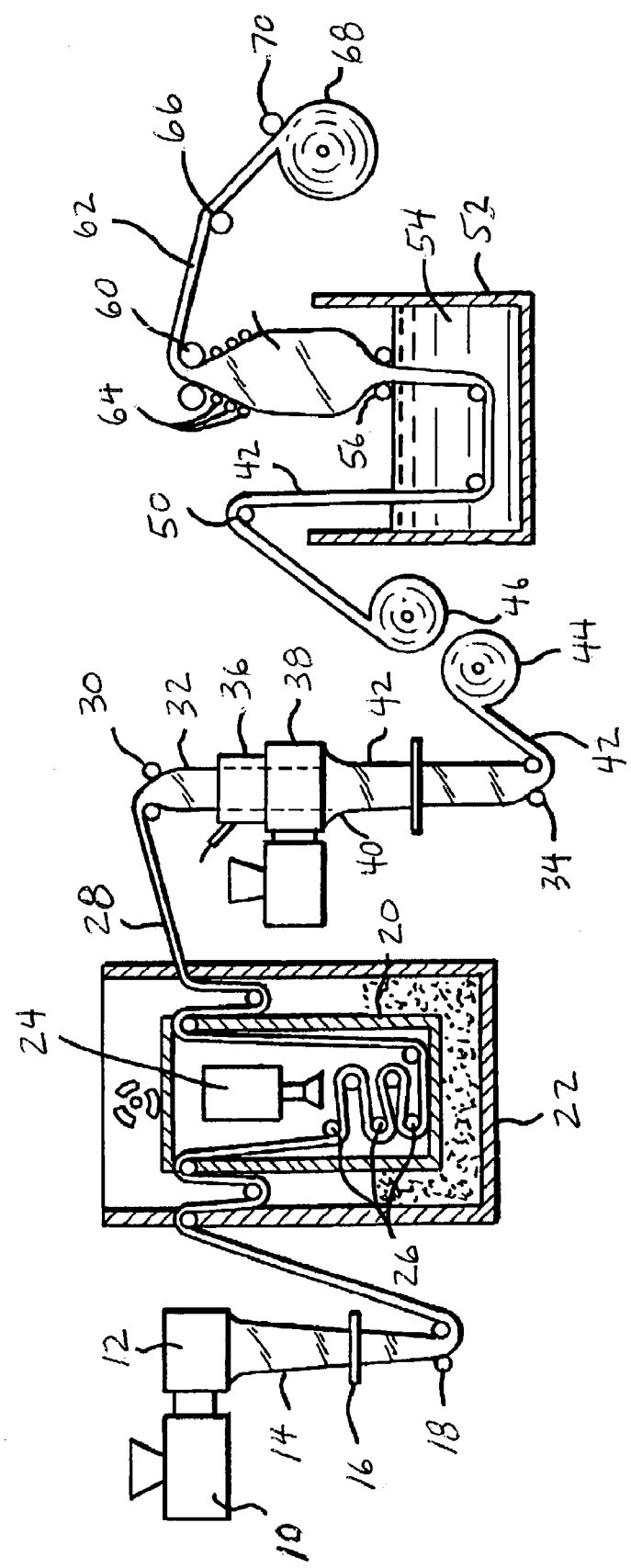
FIG. 1 is a schematic of a preferred process for making a heat-shrinkable film in accordance with the present invention.

As used herein, the term "film" is used in a generic sense to include plastic web, regardless of whether it is film or sheet. Preferably, films of and used in the present invention have a thickness of 4 mils or less. As used herein, the term "package" refers to packaging materials configured around an article being packaged. The phrase "packaged product," as used herein, refers to the combination of the article which is surrounded by the package.

As used herein, the term "seal" refers to any seal of a first portion (i.e., region) of a film surface to a second portion of a film surface, wherein the seal is formed by heating the portions to at least their respective seal initiation temperatures. The sealing can be performed in any one or more of a wide variety of manners, such as using a heated bar, hot air, hot wire, infrared radiation, ultrasonic sealing, radio frequency sealing, etc. The preferred sealing mechanism is an impulse heat seal made using a seal wire through which a pulse of electricity is passed.

As used herein, the term "copolymer" refers to polymers formed by the polymerization reaction of at least two different monomers. For example, the term "copolymer" includes the copolymerization reaction product of ethylene and an alpha-olefin, such as 1-hexene. The term "copolymer" is also inclusive of, for example, the copolymerization of a mixture of ethylene with propylene and 1-hexene and 1-octene, or even, for example, alpha-beta unsaturated acids, or derivatives thereof. As used herein, the term "copolymerization" refers to the simultaneous polymerization of two or more monomers. The term "copolymer" is also inclusive of random copolymers, block copolymers, and graft copolymers.

As used herein, copolymers are identified, i.e., named, in terms of the monomers from which the copolymers are produced. For example, the phrase "ethylene/alpha-olefin copolymer" refers to a copolymer produced by the copolymerization of ethylene as a first comonomer and an alpha-olefin as the second comonomer, with or without additional comonomer(s). As used herein, the term "mer" refers to a unit of a polymer, which is derived from a monomer used in the polymerization reaction. For example, the phrase "alpha-olefin mer" refers to a unit in, for example, an ethylene/alpha-olefin copolymer, the polymerization unit being that "residue" which is derived from the alpha-olefin monomer after it reacts to become a portion of the polymer chain, i.e., that portion of the polymer contributed by an individual alpha-olefin monomer after it reacts to become a portion of the polymer chain.

As used herein, the phrase "heterogeneous polymer" refers to polymerization reaction products of relatively wide variation in molecular weight and relatively wide variation in composition distribution, i.e., polymers made, for example, using conventional Ziegler-Natta catalysts. Heterogeneous polymers can be used in various layers of the film of the present invention. Such polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts have a variety of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum. Such catalyst systems are disclosed in, for example, U.S. Pat. No. 4,302,565, to GOEKE, et. al., and U.S. Pat. No. 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers can be used in various layers of the multilayer film of the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), narrow melting point range, and single melt point behavior. The molecular weight distribution ($M_w/M_n$), also known as "polydispersity," may be determined by gel permeation chromatography. Homogeneous ethylene/alpha-olefin copolymers which can be used in the present invention preferably have an $M_w/M_n$ of less than 2.7; more preferably from about 1.9 to 2.5; still more preferably, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules-having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes homogeneous copolymers (i.e., narrow composition distribution as assessed by CDBI values generally above 70%) from VLDPEs available commercially which generally have a broad composition distribution as assessed by CDBI values generally less than 55%. TREF data and calculations therefrom for determination of CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p.441 (1982). Preferably, homogeneous ethylene/alpha-olefin copolymers have a CDBI greater than about 70%, i.e., a CDBI of from about 70% to 99%. In general, homogeneous ethylene/alpha-olefin copolymers useful in the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to 105° C. Preferably the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 105° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min.

A homogeneous ethylene/alpha-olefin copolymer can, in general, be prepared by the copolymerization of ethylene and any one or more alpha-olefin. Preferably, the alpha-olefin is a $C_3$-$C_{20}$ alpha-monoolefin, more preferably, a $C_4$-$C_{12}$ alpha-monoolefin, still more preferably, a $C_4$-$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. No. 5,206,075, to HODGSON, Jr., U.S. Pat. No. 5,241,031, to MEHTA, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another species of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties.

As used herein, the term "polyolefin" refers to any polymerized olefin, which can be linear, branched, cyclic, aliphatic, substituted, or unsubstituted. More specifically, included in the term polyolefin are homopolymers of olefin, copolymers of olefin, copolymers of an olefin and an non-olefinic comonomer copolymerizable with the olefin, such as unsaturated ester, unsaturated acid (especially alpha-beta monocarboxylic acids), unsaturated acid anhydride, unsaturated acid metal neutralized salts, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, the phrase "modified polymer", as well as more specific phrases such as "modified ethylene vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the phrases "ethylene/alpha-olefin copolymer", refers to such heterogeneous materials as medium density polyethylene (MDPE), linear low density polyethylene (LLDPE), and very low and ultra low density polyethylene (VLDPE and ULDPE); as well as to such homogeneous ethylene/alpha olefin copolymers as: metallocene-catalyzed EXACT (TM) linear homogeneous ethylene/alpha olefin copolymer resins obtainable from the Exxon Chemical Company, of Baytown, Tex., homogeneous substantially linear ethylene/alpha-olefin copolymers having long chain branching (e.g., copolymers known as AFFINITY (TM) resins, and ENGAGE (TM) resins, available from the Dow Chemical Company, of Midland, Mich.), as well as TAFMER (TM) linear homogeneous ethylene/alpha-olefin copolymer resins obtainable from the Mitsui Petrochemical Corporation. Both the heterogeneous polymers and homogeneous polymers referred to above generally include copolymers of ethylene with one or more comonomers selected from $C_4$ to $C_{10}$ alpha-olefin such as butene-1 (i.e., 1-butene), hexene-1, octene-1, etc. While LDPE and MDPE are more highly branched than LLDPE, VLDPE, ULDPE, EXACT (TM) resin, and TAFMER (TM) resin, this latter group of resins has a relatively large number of short branches rather than the longer branches present in LDPE and MDPE. AFFINITY (TM) resins and ENGAGE (TM) resins have a relatively large number of short branches in combination with a relatively small number of long-chain branches. LLDPE has a density usually in the range of from about 0.91 grams per cubic centimeter to about 0.94 grams per cubic centimeter.

In general, the ethylene/alpha-olefin copolymer comprises a copolymer resulting from the copolymerization of from about 80 to 99 weight percent ethylene and from 1 to 20 weight percent alpha-olefin. Preferably, the ethylene alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "inside layer" refers to an outer film layer, of a multilayer film packaging a product, which is closest to the product, relative to the other layers of the multilayer film. "Inside layer" also is used with reference to the innermost layer of a plurality of concentrically arranged layers simultaneously coextruded through an annular die, or the inside layer of a seamed film tubing.

As used herein, the phrase "outer layer" refers to any film layer of film having less than two of its principal surfaces directly adhered to another layer of the film. The phrase is inclusive of monolayer and multilayer films. All multilayer films have two, and only two, outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "outside layer" refers to the outer layer, of a multilayer film packaging a product, which is furthest from the product relative to the other layers of the multilayer film. "Outside layer" also is used with reference to the outermost layer of a plurality of concentrically arranged layers of a seamless tubing, or the outermost layer of a seamed film tubing.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "core", and the phrase "core layer", as applied to multilayer films, refer to any inner film layer which has a primary function other than serving as an adhesive or compatibilizer for adhering two layers to one another. Usually, the core layer or layers provide the multilayer film with a desired level of strength, i.e., modulus, and/or optics, and/or added abuse-resistance, and/or specific impermeability.

As used herein, the phrases "seal layer," "sealing layer," "heat seal layer," and "sealant layer," refer to an outer film layer, or layers, involved in the sealing of the film to itself, another film layer of the same or another film, and/or another article which is not a film. It should also be recognized that in general, up to the outer 3 mils of a film can be involved in the sealing of the film to itself or another layer. With respect to packages having only fin-type seals, as opposed to lap-type seals, the phrase "sealant layer" generally refers to the inside film layer of a package, as well as supporting layers within 3 mils of the inside surface of the sealant layer, the inside layer frequently also serving as a food contact layer in the packaging of foods. In general, sealant layers employed in the packaging art have included thermoplastic polymers, such as polyolefin, polyamide, polyester, and polyvinyl chloride.

Preferably, the seal layer comprises a polymer having a melting point of from 30° C. to 150° C., more preferably from 60° C. to 125° C., and more preferably from 70° C. to 120° C. Homogeneous ethylene/alpha-olefin copolymer is a preferred polymer for use in the seal layer. Preferably, one or more polymers in the seal layer has a melt index of from 0.1 to 100 g/10 min, more preferably from 0.1 to 50 g/10 min, and more preferably from 1.0 to 40 g/10 min. Preferably, the seal layer has a thickness of from 0.01 to 0.20 mil, more preferably from 0.02 to 0.15 mil, more preferably from 0.03 to 0.1 mil.

As used herein, the phrase "tie layer" refers to any inner film layer having the primary purpose of adhering two layers to one another. Tie layers can comprise any polymer having a polar group thereon, or any other polymer which provides sufficient interlayer adhesion to adjacent layers comprising otherwise nonadhering polymers. Preferred tie layers comprise anhydride modified (i.e., anhydride grafted) linear low density polyethylene, and anhydride modified high density polyethylene, and ethylene propylene copolymer.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process by which the outputs of two or more extruders are brought smoothly together in a feed block, to form a multilayer stream that is fed to a die to produce a layered extrudate. Coextrusion can be employed in film blowing, sheet and flat film extrusion, blow molding, and extrusion coating.

As used herein, the phrase "machine direction", herein abbreviated "MD", refers to a direction "along the length" of the film, i.e., in the direction of the film as the film is formed during extrusion and/or coating. As used herein, the phrase "transverse direction", herein abbreviated "TD", refers to a direction across the film, perpendicular to the machine or longitudinal direction.

As used herein, the phrase "free shrink" refers to the percent dimensional change in a 10 cm×10 cm specimen of film, when shrunk at 185° F., with the quantitative determination being carried out according to ASTM D 2732, as set forth in the 1990 *Annual Book of ASTM Standards*, Vol. 08.02, pp. 368-371, which is hereby incorporated, in its entirety, by reference thereto. Unless otherwise indicated, all free shrink values disclosed herein are, of course, "total" free shrink values, which represent a sum of (a) the percent free shrink in the longitudinal (i.e., "machine") direction dimension and (b) the percent free shrink in transverse direction.

The multilayer film of the present invention has at least two layers, and preferably has from 2 to 8 layers, more preferably 2-6 layers, more preferably 3-5 layers, more preferably 2-4 layers, and more preferably, 3 layers. Several preferred 3-layer film structures in accordance with the present invention are disclosed below in Examples 1-4.

The multilayer film of the present invention can have any total thickness desired, so long as the film provides the desired properties for the particular packaging operation in which the film is used. Preferably, the film used in the present invention has a total thickness (i.e., a combined thickness of all layers), of from about 1.5 to 4 mils (1 mil is 0.001 inch); more preferably, from about 1.7 to 3 mils; and still more preferably, from 1.8 to 2.5 mils, and more preferably, from 1.9-2.2 mils.

FIG. 1 illustrates a schematic of a preferred process for producing a heat-shrinkable multilayer film in accordance with the present invention. In the process illustrated in FIG. 1, solid polymer beads (not illustrated) are fed to a plurality of extruders 10 (for simplicity, only one extruder is illustrated). Inside extruders 10, the polymer beads are forwarded, melted, and degassed, following which the resulting bubble-free melt is forwarded into die head 12, and extruded through an annular die, resulting in tubing 14 which is 8 to 16 mils thick, more preferably 10 to 14 mils thick.

After cooling or quenching by water spray from cooling ring 16, tubing 14 is collapsed by pinch rolls 18, and is thereafter fed through irradiation vault 20 surrounded by shielding 22, where tubing 14 is irradiated with high energy electrons (i.e., ionizing radiation) from iron core transformer accelerator 24. Tubing 14 is guided through irradiation vault 20 on rolls 26. Preferably, tubing 14 is irradiated to a level of about 60 to 70 kiloGrays (kGy).

After irradiation, irradiated tubing 28 is directed through nip rolls 30, following which tubing 28 is slightly inflated, resulting in slightly inflated tubing 32 which contains a trapped bubble of air. However, slightly inflated tubing 32 is not significantly drawn longitudinally, as the surface speed of nip rolls 34 are about the same speed as nip rolls 30. Furthermore, slightly inflated tubing 32 is inflated only enough to provide a substantially circular tubing without significant transverse orientation, i.e., without stretching.

The slightly inflated, irradiated tubing 36 is passed through vacuum chamber 36, and thereafter forwarded through coating die 38. Second tubular film 40 is melt extruded from coating die 38 and coated onto slightly inflated, irradiated tube 32, to form multi-ply tubular film 42. Further details of the above-described coating step are generally as set forth in U.S. Pat. No. 4,278,738, to BRAX et. al., which is hereby incorporated by reference thereto, in its entirety.

After irradiation and coating, multi-ply tubing film 42 is wound up onto windup roll 44. Thereafter, windup roll 44 is removed and installed as unwind roll 46, on a second stage in the process of making the tubing film as ultimately desired. Multi-ply tubular film 42, from unwind roll 46, is unwound and passed over guide roll 50, after which multi-ply tubular film 42 passes into hot water bath tank 52 containing hot water 54. The now collapsed, irradiated, coated tubular film 42 is submersed in hot water 54 (having a temperature of about 200° F.) for a retention time of at least about 5 seconds, i.e., for a time period in order to bring the film up to the desired temperature for biaxial orientation. Thereafter, irradiated tubular film 42 is directed through nip rolls 56, and bubble 58 is blown, thereby transversely stretching tubular film 42. Furthermore, while being blown, i.e., transversely stretched, nip rolls 60 draw tubular film 42 in the longitudinal direction, as nip rolls 60 have a surface speed higher than the surface speed of nip rolls 56. As a result of the transverse stretching and longitudinal drawing, partially-irradiated, coated, biaxially-oriented blown tubing film 62 is produced, this blown tubing preferably having been both stretched in a ratio of from about 1:1.5-1:6, and drawn in a ratio of from about 1:1.5-1:6. More preferably, the stretching and drawing are each performed a ratio of from about 1:2-1:4. The result is a biaxial orientation of from about 1:2.25-1:36, more preferably, 1:4-1:16. While bubble 58 is maintained between pinch rolls 56 and 60, blown tubing film 62 is collapsed by rolls 64, and thereafter conveyed through nip rolls 60 and across guide roll 66, and then rolled onto wind-up roll 68. Idler roll 70 assures a good wind-up.

Figure 2:
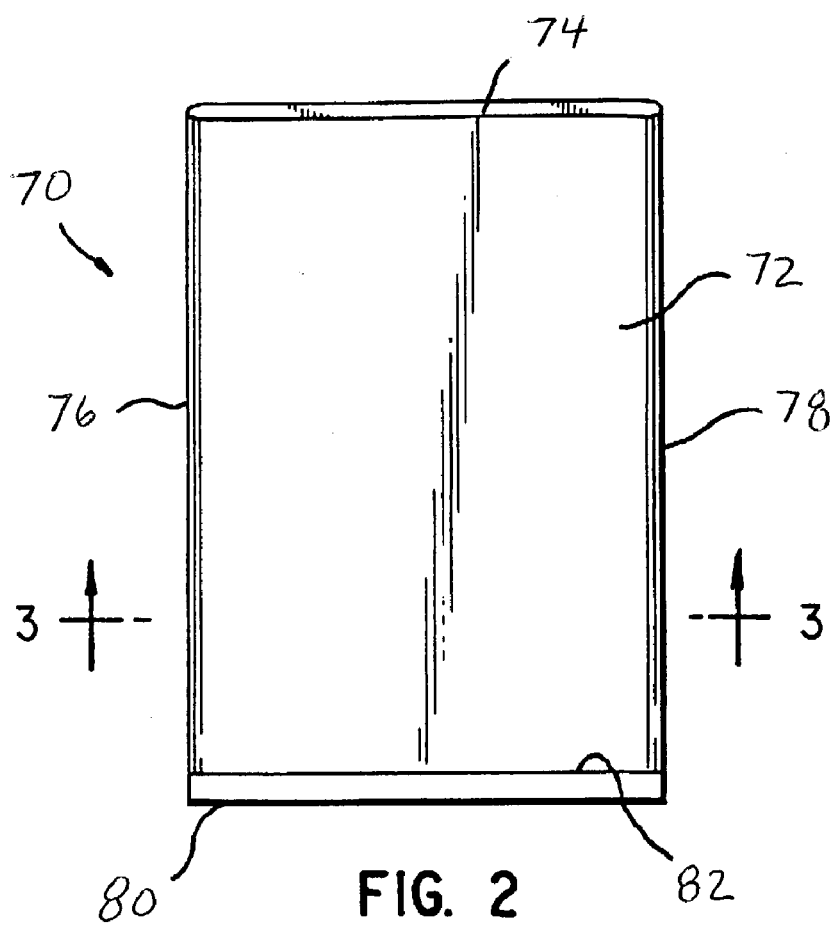
FIG. 2 is a schematic of an end-seal bag in accordance with the present invention.
Figure 3:
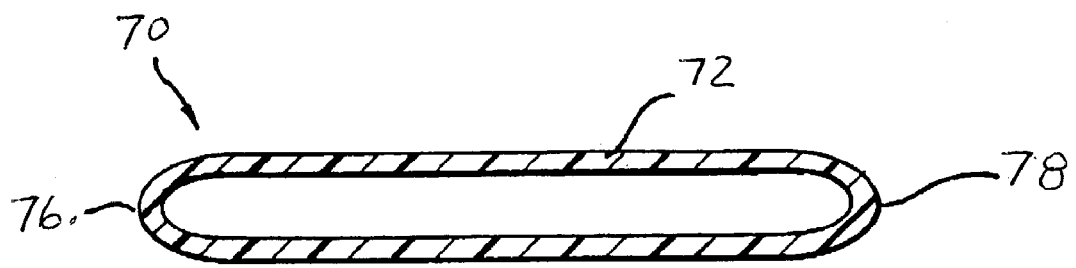
FIG. 3 is a transverse cross-sectional view taken through section 3-3 of FIG. 2.

FIG. 2 is a schematic of a preferred end seal bag 70, in a lay-flat position, this bag being in accord with the present invention. FIG. 3 is a cross-sectional view of bag 70 taken through section 3-3 of FIG. 2. Viewing FIGS. 2 and 3 together, bag 70 comprises seamless tubular bag film 72, with top edge 74 defining an open top, first folded (i.e., seamless) bag side edge 76, second folded (i.e., seamless) bag side edge 78, bottom edge 80, and transverse end seal 82 in which the inside layer of the film is sealed to itself to close the bottom of the bag.

Figure 4:
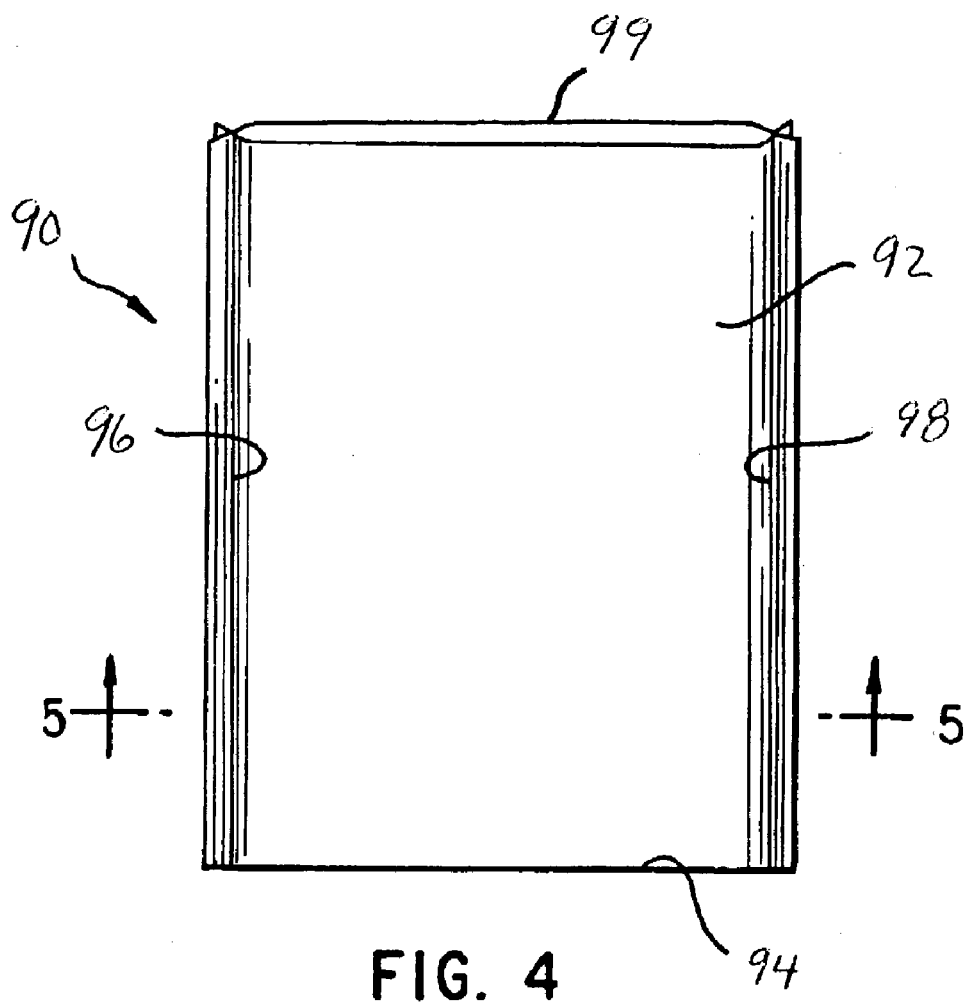
FIG. 4 is a schematic of a side-seal bag in accordance with the present invention.
Figure 5:
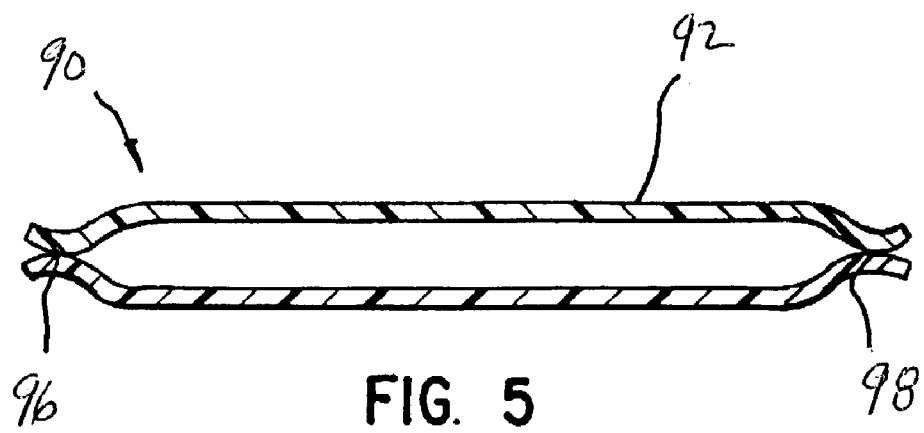
FIG. 5 is a transverse cross-sectional view taken through section 5-5 of FIG. 4.
Figure 6:
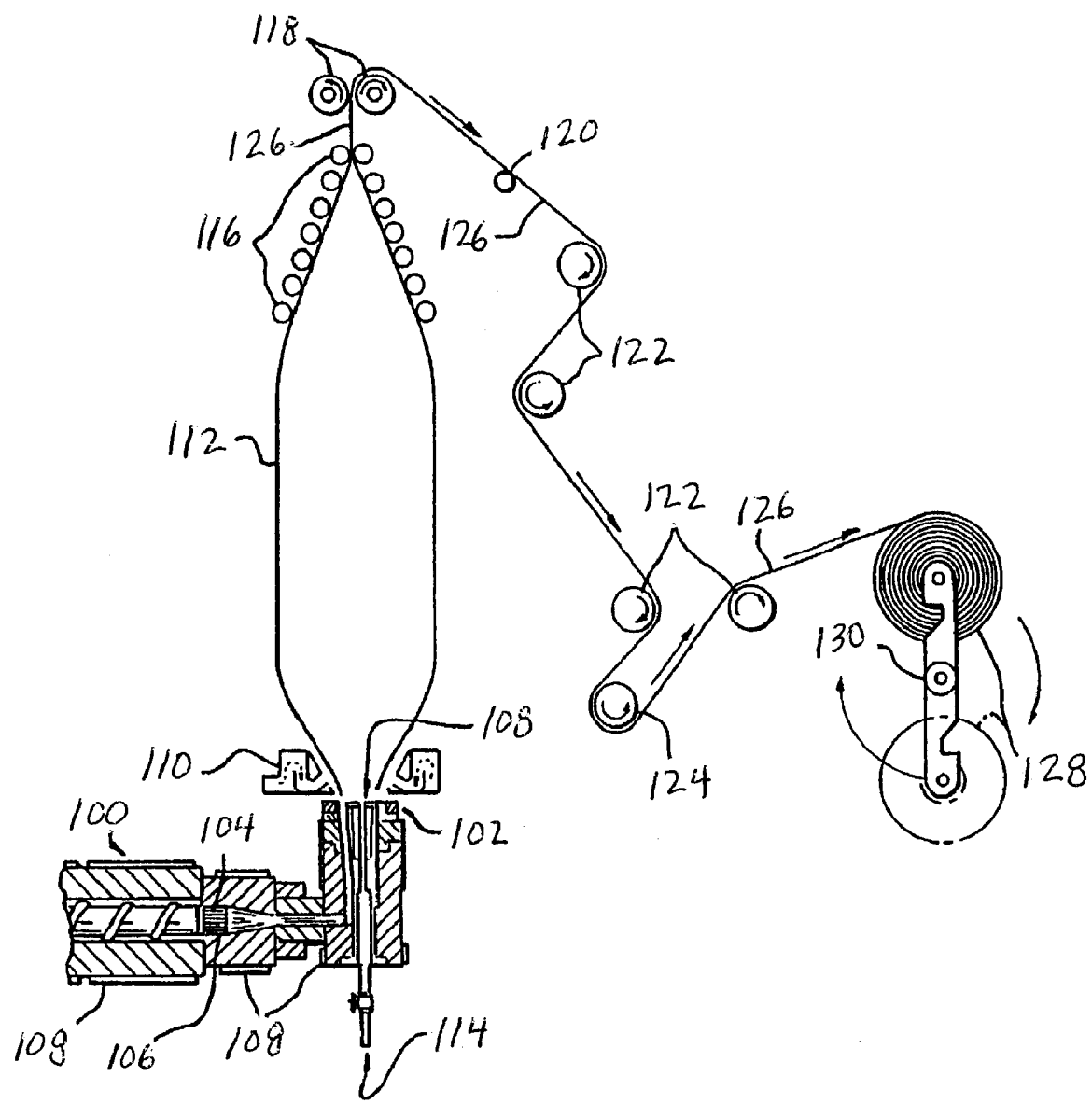
FIG. 6 is a schematic of a preferred process for making a non-heat-shrinkable film in accordance with the present invention.

FIGS. 4 and 5 illustrate side-seal bag 90, with FIG. 5 illustrating a schematic of side seal bag 90 in lay-flat position, and FIG. 6 illustrating a transverse cross-section through section 5-5 of FIG. 4. With reference to FIGS. 4 and 5 together, side seal bag 90 is comprised of bag film 92, folded (i.e., seamless) bottom edge 94, first side seal 96, and second side seal 98, and with top edge 99 defining the open top of the bag.

FIG. 6 illustrates a schematic view of a process according to the present invention, for producing a non-heat-shrinkable, hot-blown multilayer film in accordance with the present invention. This film is called "hot-blown" because the polymer is oriented in the bubble immediately downstream of the die head, while the polymer is hot, i.e., above, at, or near its melting point, at which time molecular orientation can occur while the polymer chains remain relaxed (versus orientation at or near the softening point, as used in heat-shrinkable film process of FIG. 1).

Although for the sake of simplicity only one extruder 100 is illustrated in FIG. 6, there are preferably at least 2 extruders, and more preferably, at least three extruders. That is, preferably at least one extruder, and more preferably two extruders, supply molten polymer to coextrusion die 102 for the formation of, for example, outer layers of the film of Example No. 5 (disclosed below in the various examples of the present invention), and at least one additional extruder (not illustrated) supplied molten polymer to coextrusion die 102 for the formation of, for example, the core layer of the film of Example No. 5. Each of the extruders is supplied with polymer pellets (not shown) suitable for the formation of the respective layer it is extruding. The extruders subject the polymer pellets to sufficient pressure and heat to melt the polymer and thereby prepare it for extrusion through a die.

Taking extruder 100 as an example, each of the extruders is preferably equipped with a screen pack 104, a breaker plate 106, and a plurality of heaters 108. Each of the coextruded film layers is extruded between mandrel 108 and die 102, and the extrudate is cooled by cool air flowing from air ring 110. The resulting blown bubble is thereafter guided into a collapsed configuration by nip rolls 118, via guide rolls 116. Collapsed film tubing 126 (in lay-flat configuration) is optionally passed over treater bar 120, and is thereafter passed over idler rolls 122, and around dancer roll 124 which imparts tension control to collapsed tube 126, after which collapsed film tubing is wound into roll 128 via winding mechanism 130.

The non-heat-shrinkable film made in accordance with the process of FIG. 6 has a total free shrink (i.e., longitudinal+ transverse) at 185° F., of less than 10 percent. This film is especially suitable for use as a top web film for vacuum skin packaging in accordance with, for example, U.S. Pat. No. 3,835,618, to Richard Perdue, entitled "Apparatus for Producing Vacuum Skin Package in Multiples", and U.S. Pat. No. 6,042,913, to Miranda et al, entitled "Vacuum Skin Package and Composite Film Therefor", both of which are hereby incorporated, in their entireties, by reference thereto. The VSP process is useful for the packaging of fresh seafood, and can benefit from a relatively thick film exhibiting an OTR of at least 10,000 cc/m$^2$/day @STP.

The various polymeric materials used in the examples below, as well as in examples of various comparative films, are set forth below in Table I.

TABLE I

Identity of Resins Used in Examples

| Generic Code Name | Generic Name | Vendor | Trade Name | Density | Melt Index | Comonomer Content (%) |
|---|---|---|---|---|---|---|
| EBAc$_1$ | Ethylene Butyl Acrylate | Voridian | SP-1802 | 0.928 | 0.5 | 18 |
| LLDPE$_1$ | Hexene LLDPE | ExxonMobil | Escorene ® LL3003.32 | 0.9175 | 3.2 | 10 |
| LLDPE$_2$ | Octene LLDPE | Dow | Dowlex ® 2045.03 | 0.920 | 1.1 | 6.5 |
| mPE$_1$ | Branched metallocene PE | Dow | Affinity ® PL1280 | 0.900 | 6.0 | 13 |
| mPE$_2$ | Branched metallocene PE | Dow | Affinity ® PL 1850 | 0.902 | 3.0 | 12 |
| mPE$_3$ | Branched metallocene PE | Dow | Affinity ® PF1140 | 0.8965 | 1.6 | 14 |
| mPE$_4$ | Branched metallocene PE | Dow | Affinity ® EG8100 | 0.870 | 1.0 | unknown |
| EVA$_1$ | EVA | Dupont | Elvax ® PE3507-2 | 0.9312 | 2.6 | 6.2 |
| EVA$_2$ | EVA | ExxonMobil | Escorene ® LD-318.92 | 0.930 | 2.0 | 9 |
| VLDPE$_1$ | VLDPE | Dow | Attane ® 4203 | 0.905 | 0.80 | 11.5 |

TABLE I-continued

Identity of Resins Used in Examples

| Generic Code Name | Generic Name | Vendor | Trade Name | Density | Melt Index | Comonomer Content (%) |
|---|---|---|---|---|---|---|
| HDPE$_1$ | HDPE | Solvay | Fortiflex ® T60-500-119 | 0.961 | 6.2 | 0 |
| MB$_1$ | Antiblock Masterbatch | Teknor Color | 10,0758CP Syloid ® Concentrate | unknown | unknown | unknown |
| LLDPE$_3$ | LLDPE | Dow | Dowlex ® 2244G | 0.9155 | 3.3 | unknown |

The following Examples are intended to illustrate the preferred embodiments of the invention and it is not intended to limit the invention thereby. Percentages indicated in the examples are % by weight. While certain representative embodiments and details have been shown for the purpose of illustration, numerous modifications to the formulations described above can be made without departing from the invention disclosed.

EXAMPLES 1-4

Four multi-layer films were made by the method schematically illustrated in FIG. 1, this process being described above. The downward cast, multilayer, seamless annular coextruded tape was quenched and passed through nip rolls which forced the extrudate into the configuration of a lay-flat annular tape. This substrate tape was guided through an ionizing radiation field in which the beam of an electron accelerator exposed the multilayer substrate tape to a radiation dosage in the range of about 64 kGy. Thereafter, the irradiated substrate tape was partially inflated and extrusion coated with additional layers through an annular, multilayer extrusion coating die, in accordance with Brax et al, identified above.

The resulting extrusion coated, partially-irradiated multilayer tape was then cooled and collapsed, and then reheated by immersion in hot water followed by exposure to steam, and thereafter biaxially stretched at a temperature below the melting point of at least the outer layers of the tape. Stretching was carried out both in the transverse direction and in the longitudinal direction (i.e., machine direction), by passing the tape between a pair of nip rolls with a trapped bubble of air therebetween, with the downstream nip rolls rotating at a speed higher than the speed of the upstream nip rolls. The size of the bubble, and the relative speeds of the nip rollers, were such that the extrusion coated tape was oriented 4:1 in the transverse direction and 3:1 in the machine direction, for an overall biaxial orientation of 12:1.

The resulting biaxially-oriented, heat-shrinkable film was would up as lay-flat, seamless, tubular film, and thereafter converted into bags using commercial quality bag making machines. The bags were used to package fresh fish products and were vacuumized and sealed using vacuum chamber equipment commonly well known to those in the meat packaging industry. The packaged fish had good eye appeal as the packages were glossy and had a tight package appearance.

Table II provides the layer arrangement, layer composition, and layer thickness for each of Examples 1-4, which are all in accordance with the present invention. For each of the films of Examples 1-4, the substrate portion of the film consisted of layers 1, 2, and 3, and the extrusion-coating portion of the film consisted of layers 4, 5, and 6. As inner layers 2 and 3 were supplied to the extrusion die by separate extruders, and layers 4 and 5 were supplied to the extrusion-coating die by separate extruders, each of layers 2, 3, 4, and 5 can be considered to be "separate" layers, from the viewpoint that they are prepared using separate extruders and/or separate die openings. Moreover, layers 2 and 3, being a portion of the "substrate", were crosslinked by exposure to irradiation, while layers 4 and 5, being extrusion-coated onto the substrate, were not exposed to irradiation. However, layers 2, 3, 4, and 5 may alternatively be viewed as being one layer, as they are all made from the same polymer, i.e., 100% ethylene/butyl acrylate copolymer. Moreover, in the final product, layers 2, 3, 4, and 5 appear as one layer, because compositionally they are substantially identical.

TABLE II

Structure and Composition of Multilayer Films of Examples 1-4

| | Layer No. 1: Composition * * * % of total film thickness | Layer No.s 2, 3, 4, & 5: Composition * * * % of total film thickness | Layer No. 6: Composition * * * % of total film thickness |
|---|---|---|---|
| Example No. 1 | 80% mPE$_1$ 20% LLDPE$_1$ * * * 8.3% | 100% EBAc$_1$ * * * 83.3% | 85% mPE$_2$ 15% LLDPE$_2$ * * * 8.3% |
| Example No. 2 | 80% mPE$_1$ 20% LLDPE$_1$ * * * 4.2% | 100% EBAc$_1$ * * * 91.6% | 85% mPE$_2$ 15% LLDPE$_2$ * * * 4.2% |
| Example No. 3 | 80% mPE$_1$ 20% LLDPE$_1$ * * * 4.6% | 100% EBAc$_1$ * * * 90.8% | 85% mPE$_2$ 15% LLDPE$_2$ * * * 4.6% |
| Example No. 4 | 80% mPE$_1$ 20% LLDPE$_1$ * * * 8.3% | 100% EBAc$_1$ * * * 83.3% | 80% mPE$_1$ 20% LLDPE$_1$ * * * 8.3% |

It should be noted that the composition of the film of Example No. 1 is very close to the same as the film of Example No. 4. The difference is in the polymeric composition of the outside layer: both have the same percentages of metallocene-catalyzed ethylene/alpha-olefin copolymer and LLDPE. However, the particular polymers selected differ in density and melt index. It has been found that the physical properties of the film of Example No. 1 are essentially equivalent.

Oxygen Transmission Rate Measurements for Films of Examples 1-3

The oxygen transmission rate (i.e., "OTR") for various film samples in accordance with each of Examples 1-4 was measured on an Illinois Instruments 8500 oxygen transmission analyzer. The film of Example No. 1 was produced in three different gauges (see "Average Gauge" in Table III below) by varying the tape thickness, with the amount of orientation being kept the same as described in Examples 1-4 above. The film of Example No. 2 was produced in two different gauges, with both results provided below. The film of Example No. 3 was produced in only one average gauge. Three sample portions of each film were analyzed, with the OTR results being averaged to arrive at the average OTR set forth below. The results of the OTR analyses are presented in Table III, below, in which it can be seen that each of the films of Examples 1-4 exhibited an average OTR greater than 10,000 cc/m$^2$/day @STP. The OTR and gauge of the film of Example No. 4 is set forth in Table VII, below.

TABLE III

Oxygen Transmission Rate at @STP (73° F., 0% relative humidity, seal level)

| Film Sample From | OTR (cc/m$^2$/day @STP) | Average Gauge (mils) |
|---|---|---|
| Example No. 1 | 13332 | 1.98 |
| Example No. 1 | 15120 | 2.02 |
| Example No. 1 | 11358 | 2.22 |
| Example No. 2 | 15139 | 1.95 |
| Example No. 2 | 12690 | 2.29 |
| Example No. 3 | 13839 | 2.07 |

In general, the data in Table III demonstrates that the thicker the film, the lower the OTR, all other factors remaining the same. It is important to precisely control the overall gauge of the film to control OTR. Comparing Table III to Table II, it can also be seen that OTR is maximized by minimizing the skin (outer layer) thickness.

A second sample of the same film of Example No. 2 which had an average gauge of 1.95 mil was selected for further analysis because it had the highest OTR. The OTR of this additional sample of this film was analyzed on a Mocon OX-TRAN® measurement device, with the measured OTR being 14,200 cc/m$^2$/day @STP on pieces of film having an average gauge of 1.94 mils. This method of OTR measurement is in accordance with ASTM D-3985, which is hereby incorporated, in its entirety, by reference thereto. Table IV, below, provides the OTR results obtained for this additional sample of the film of Example No. 2. The film of Example No. 4 was also analyzed by the same method, with the results also provided in Table IV, below.

TABLE IV

OTR@STP of Films of Example No. 2 and Example No. 4, Measured by Method in Accordance with ASTM D-3985

| Film of Example No. 2 | OTR (cc/m$^2$/day @STP) | Gauge (mils) |
|---|---|---|
| Piece #1 | 15256 | 1.91 |
| Piece #2 | 14284 | 2 |
| Piece #3 | 13032 | 1.92 |
| Average | 14280 | 1.94 |
| Film of | 10,370 | 2.11 |

TABLE IV-continued

OTR@STP of Films of Example No. 2 and Example No. 4, Measured by Method in Accordance with ASTM D-3985

| Film of Example No. 2 | OTR (cc/m$^2$/day @STP) | Gauge (mils) |
|---|---|---|
| Example No. 4 | | (average gauge, mils) |

(all measurements taken at 73° F., 0% relative humidity, 1 atm pressure)

More Physical Properties for the Film of Example No. 2

In addition to various measurements of the OTR for the first and second samples of the film of Example No. 2, as provided (respectively) in Table III and Table IV, above, two additional samples (Sample #3 and Sample #4) were taken from the film of Example No. 2. In addition to measuring OTR on these samples, additional physical properties were also measured. Table V, below, indicates how important it is to precisely control the thickness of the film. Sample #3, which had an average gauge of 2.04 mils, exhibited an OTR of 10,280 cc/m$^2$/day @STP, using the a Mocon OX-TRAN® measurement device, in accordance with ASTM D-3985. As the OTR measurement was 10,280 cc/m$^2$/day @STP, it is apparent how important it is to precisely control the gauge if the film is to be used for the packaging of fresh seafood, which under FDA regulations must have an OTR of at least 10,000 cc/m$^2$/day @STP. As a result, it is preferred that the average gauge of the film of Example No. 2 be no greater than 1.90 mil. As can be seen in Table V, the film of Sample #4 had an average gauge of 1.81 mils and an OTR of 11,430 cc/m$^2$/day @STP.

TABLE V

Physical Properties of High OTR Bag Made from the Film of Example No. 2

| Film of Example No. 2 | Sample #3 | Sample #4 |
|---|---|---|
| Color | Clear | Clear |
| Nominal Gauge (mil) | 2.0 | 2.0 |
| Oxygen Transmission Rate | | |
| OTR (cc/m$^2$/day @STP) | 10,280 | 11,430 |
| Average Gauge (mil) | 2.04 | 1.81 |
| Tensile & Elongation | | |
| Tensile (psi) - L | 5550 | 5690 |
| Tensile (psi) - T | 5060 | 5600 |
| Elongation (%) - L | 220 | 210 |
| Elongation (%) - T | 140 | 140 |
| Modulus (psi) - L | 11,000 | 10,500 |
| Modulus (psi) - T | 7,700 | 8,820 |
| Tear Propagation - L/T | | |
| Average Load Between Limits (g) | 56/51 | 64/65 |
| Load at Max (g) | 114/93 | 149/160 |
| Energy to Break (g-in) | 107/— | 142/146 |
| Displacement to Break (in) | 2.1/— | 2.2/2.1 |
| Average Gauge (mil) | 2.0/2.1 | 2.0/1.9 |
| Tear Resistance - L/T | | |
| Load at Max. (g) | 317/421 | 312/359 |
| Energy to Break (g-in) | No data | 101/144 |
| Displacement (in) | No data | 0.49/0.59 |
| Average Gauge (mil) | 1.9/2.0 | 1.9/1.8 |
| Color | Clear | Clear |

TABLE V-continued

Physical Properties of High OTR Bag
Made from the Film of Example No. 2

| Film of Example No. 2 | Sample #3 | Sample #4 |
|---|---|---|
| Nominal Gauge (mil) | 2.0 | 2.0 |
| Instrumented Impact | | |
| Break Load (N) | 66 | 64 |
| Energy to Break (J) | 0.87 | 0.72 |
| Displacement (mm) | 31 | 29 |
| Average Gauge (mil) | 1.92 | 1.92 |
| Shrink Tension (psi) - L/T | | |
| 185° F. | 189/171 | 176/164 |
| 200° F. | 191/163 | 177/153 |
| Free Shrink (%) | | |
| 185° F. (L/T) | 46/55 | 50/56 |
| 200° F. (L/T) | 72/69 | 73/70 |

Comparison of Physical Properties of Bag Made
From Film of Examples No. 4 With Prior Art Bag
Previously Used for Packaging Seafood A comparative prior art bag, commercially available as the "L700 Bag" from the Cryovac Division of Sealed Air Corporation and which was of a type which has been used in the past for the packaging of fresh seafood, was compared with a bag made from the film of Example No. 4, described above. The L700 Bag was a bag made from a 6-layer film made by the same basic process used for making the heat-shrinkable films of Examples No. 4. More particularly, the first 3 layers were coextruded, exposed to 62 kGy of electron beam irradiation, then extrusion coated with the three additional layers, and then biaxially oriented out of hot water by the trapped bubble process. The film had a total thickness of 2.4 mils. The film consisted of approximately 50% LLDPE and approximately 50% EVA. Both the L700 bag and the bag made from the film of Example No. 4 were end-seal bags. Table VI, below, provides the layer arrangement and composition of the film from which the L700 bag was made.

TABLE VI 2.4 Mil Film from which the L700 Bag Was Made

| | Layer Number | | | | | |
|---|---|---|---|---|---|---|
| | 1st | 2nd | 3rd | 4th | 5th | 6th |
| Layer Composition | 90% $EVA_1$ 10% $LLDPE_2$ | 90% $LLDPE_2$ 10% $EVA_2$ | 100% $EVA_2$ | 100% $EVA_2$ | 85% $EVA_2$ 15% $LLDPE_2$ | 85% $EVA_2$ 15% $LLDPE_2$ |
| Layer Gauge (mil) | 0.26 | 1.05 | 0.07 | 0.09 | 0.60 | 0.34 |
| Irradiation Level (kGy) | | 62 | | | 0 | |

In addition, various physical property measurements were made on both the film used in the L700 bag and the film of Example No. 4. These physical property measurements are set forth in Table VII, below.

TABLE VII

Physical Properties of L700 Comparative Bag
VS. Bag Made from Film of Example No. 4

| Film/Bag Property | L700 Comparative Example | Example No. 4 |
|---|---|---|
| Color | Clear | Clear |
| Targeted Gauge (mil) | 2.4 | 2.0 |
| Oxygen Transmission Rate | | |
| OTR (cc/m$^2$/day @STP) | 2,630 | 10,370 |
| Average Gauge (mil) | 2.57 | 2.11 |
| Tensile & Elongation | | |
| Tensile (psi) - L | 11500 | 5700 |
| Tensile (psi) - T | 10900 | 5800 |
| Elongation (%) - L | 141 | 180 |
| Elongation (%) - T | 157 | 220 |
| Modulus (psi) - L | 29500 | 8600 |
| Modulus (psi) - T | 26800 | 8000 |
| Tear Propagation - L/T | | |
| Load at Max (g/mil) | 13/21 | 59/70 |
| Energy to Break (g-in/mil) | 18/25 | 84/79 |
| Tear Resistance - L/T | | |
| Load at Max. (g/mil) | No data | 139/213 |
| Energy to Break (g-in/mil) | No data | 49/127 |
| Displacement (in) | No data | 0.53/0.82 |
| Instrumented Impact | | |
| Break Load (N/mil) | 104 | 42 |
| Energy to Break (J/mil) | 1.4 | 0.69 |
| Displacement (mm) | 33 | 37 |
| Shrink Tension (psi) - L/T | | |
| 185° F. | No data | 196/176 |
| 200° F. | No data | 207/155 |
| Free Shrink (%) | | |
| 185° F. (L/T) | 19/25 | 45/53 |

As is apparent from the OTR results reported in Table VI above, the film of Example No. 4 had a greater OTR than the film used in the L700 comparative bag. The film from which the L700 bag was made had an OTR on a per mil basis of only 6,760 cc/m$^2$/day @STP, while the film of Example No. 4 exhibited a per mil OTR of 21,881 cc/m$^2$/day @STP, which is more than 3 times the oxygen transmission rate of the L700 comparative, on a per mil basis. The per mil comparison is necessary because the two films had different gauges.

Table VI also shows how a bag made from a film having a high ethylene/butyl acrylate-content differs from a bag made from a film having a high linear low density polyethylene-ethylene/vinyl acetate content. Ethylene/butyl acrylate has a considerably lower modulus and is more rubbery than linear low density polyethylene. This is demonstrated in the tensile and elongation (T&E) data. The tear propagation for the ethylene/butyl acrylate based film is also greater than for bag made from the LLDPE-based film. This is probably due to the elastic nature of ethylene/butyl acrylate. The impact strength is lower for the ethylene/butyl acrylate based film than for the LLDPE-based film. The free shrink was greater for the ethylene/butyl acrylate film than for the LLDPE-based film. Although the film of Example No. 4 had some physical properties which differed significantly from the film from which the L700 bag was made, the film of Example No. 4 was used to package fresh and smoked fish and the only disadvantage noted was poor puncture resistance to cracked peppercorns.

Although there are a number of polyolefin resins that provide a relatively high oxygen transmission rate, they may not provide a high enough oxygen transmission rate to make a film which meets the FDA minimum OTR of 10,000 cc/m$^2$/day @STP for the packaging of fresh seafood. Alternatively, they may provide the required OTR, but may be difficult to process. For example, AFFINITY® PF 1140 resin from The Dow Chemical Company was used in place of EBAc$_1$ in the film of Example No. 4. Although the film could be manufactured in a process as illustrated in FIG. 1, the OTR was only 8800 cc/m$^2$/day @STP. An effort was also made to use AFFINITY® EG8100 resin in place of ethylene/butyl acrylate copolymer. The EG8100 resin had an OTR of about 78,000 cc/m$^2$/day @STP per mil of film thickness, and would probably yield a film/bag with the necessary OTR, but exhibited processing problems using the process of FIG. 1. The melt strength of the AFFINITY® EG 8100 was too low, and coating ripples prevented tubing from being produced. A later attempt to blend AFFINITY® PF1140 resin and AFFINITY® EG8100 resin into the core layer resulted in acceptable quality tape, but it could not be racked or oriented due to bubble instability.

EXAMPLE NO. 5

Non-Heat-Shrinkable Film Having High Oxygen Transmission Rate, Suitable for Vacuum Skin Packaging A blown film was made using a manufacturing process as illustrated in FIG. 6, described above. After the hot blown film was collapsed and slit into single-wound rolls, it was taken to an off-line electron-beam crosslinking unit. There it received crosslinking treatment of 200 kGy. The film had a total thickness of approximately 2 mils. A detailed description of the layer arrangement and layer composition of the film of Example No. 5 is set forth in Table VIII, below.

TABLE VIII

Film of Example No. 5: Layer Arrangement, Composition, and Thickness

| Film of Example No. 5 | Layer 1<br>Abuse Layer<br>1st Extruded Layer<br>Inside of Tube | Layer 2<br>Core 2nd<br>Extruded Layer | Layer 3<br>Sealant Layer<br>3rd Extruded Layer<br>Outside of Tube |
|---|---|---|---|
| Layer Composition | 95% HDPE$_1$<br>5% MB$_1$ | 100% EBAc$_1$ | 95% LLDPE$_3$<br>5% MB$_1$ |
| Layer Thickness (mil) | 0.08 | 1.84 | 0.08 |

The film of Example No. 5, being a blown film which is considered to be non-heat-shrinkable because it exhibits a total free shrink at 185° F. of less than 10 percent, is particularly designed for use as a high oxygen transmission film for use in vacuum skin packaging (VSP) of seafood, particularly fresh seafood. The film of Example No. 5 has an outer layer which serves as the seal layer, for sealing to the tray containing the fish. The sealant and abuse layers are needed for sealing and heat resistance on MULTIVAC® vacuum skin packaging equipment.

The film of Example No. 5 exhibited an OTR of about 14,000 cc/m$^2$/day @STP, measured on an Illinois Instruments 8500 oxygen transmission analyzer. It is believed that if the OTR of this film is measured on a Mocon OX-TRAN® measurement device in accordance with ASTM D-3985, the analysis would demonstrate an OTR of over 10,000 cc/m$^2$/day @STP. As with the films of Examples 1-4, the ethylene/butyl acrylate copolymer in Layer 2 of the film of Example No. 5 exhibited a high oxygen transmission rate.

All subranges of all ranges expressly disclosed herein are hereby expressly disclosed. All references to (and incorporations by reference of) ASTM protocols are to the most-recently published ASTM procedure as of the priority (i.e., original) filing date of this patent application in the United States Patent Office. While the invention has been described with reference to illustrative examples, those skilled in the art will understand that various modifications may be made to the invention as described without departing from the scope of the claims which follow.

What is claimed is:

1. A multilayer film, comprising:
   (A) a first layer which is a first outer film layer and which serves as a heat seal layer, the first layer comprising a first polymer, the first layer having a thickness of from 2 to 20 percent of a total thickness of the multilayer film; and
   (B) at least one second layer which serves as a high oxygen transmission layer, the at least one second layer consisting essentially of at least one member selected from the group consisting of:
      (i) ethylene/butyl acrylate copolymer,
      (ii) homogeneous ethylene/alpha-olefin copolymer having a density less than 0.92 g/cc;
      (iii) ethylene/methyl acrylate copolymer having a methyl acrylate mer content of from 20 to 24 mole percent;
      (iv) ethylene/vinyl acetate copolymer having a vinyl acetate mer content of from 10 to 30 mole percent;
      (v) styrene butadiene block copolymer; and
      the at least one second layer having a thickness of from 80 to 98 percent of the total thickness of the multilayer film;

the total thickness of the multilayer film being from about 1.5 mils to about 2.5 mils, and the film having an oxygen transmission rate from about 10,000 to about 15,000 cc/m$^2$/24 hr @STP.

2. A multilayer film, comprising:
(A) a first layer which is a first outer film layer and which serves as a heat seal layer, the first layer comprising a first polymer, the first layer having a thickness of from 2 to 20 percent of a total thickness of the multilayer film; and
(B) at least one second layer which serves as a high oxygen transmission layer, the at least one second layer comprising at least one member selected from the group consisting of:
  (i) ethylene/butyl acrylate copolymer,
  (ii) homogeneous ethylene/alpha-olefin copolymer having a density of from 0.86 to 0.91 g/cc
  (iii) heterogeneous ethylene/alpha-olefin copolymer having a density of from 0.89 to 0.91 g/cc;
  (iv) ethylene/methyl acrylate copolymer having a methyl acrylate mer content of from 20 to 24 mole percent;
  (v) ethylene/vinyl acetate copolymer having a vinyl acetate mer content of from 10 to 30 mole percent;
  (vi) styrene butadiene block copolymer; and
  the at least one second layer having a thickness of from 80 to 98 percent of the total thickness of the multilayer film;
the total thickness of the multilayer film being from about 1.5 mils to about 2.5 mils, and the film having an oxygen transmission rate from about 10,000 to about 15,000 cc/m$^2$/24 hr @STP.

3. The multilayer film according to claim 2, wherein the at least one second layer comprises a plurality of layers each of which comprises ethylene/butyl acrylate copolymer.

4. The multilayer film according to claim 2, wherein the film has a total free shrink at 185° F. of from 50 to 115 percent.

5. The multilayer film according to claim 2, wherein the at least one second layer consists essentially of ethylene/butyl acrylate copolymer, the multilayer film has a total film thickness of from 1.8 to 2.2 mils, and the multilayer film has a total free shrink at 185° F. of at least 15 percent.

6. The multilayer film according to claim 2, wherein at least one layer of the multilayer film comprises a polymer network which has been crosslinked by irradiation.

7. The multilayer film according to claim 2, wherein every layer of the multilayer film comprises a polymer network which has been crosslinked by irradiation.

8. The multilayer film according to claim 2, wherein the second layer further comprises mineral oil.

9. The multilayer film according to claim 2, wherein the film further comprises a third layer which is a second outer film layer, with the at least one second layer being between the first layer and the third layer, with the at least one second layer making up from 85 to 95 percent of the total film thickness, and the first and third layers together making up from 5 to 15 percent of the total film thickness.

10. The multilayer film according to claim 9, wherein the at least one second layer makes up from 90 to 95 percent of the total film thickness, with the first and third layers together making up from 5 to 10 percent of the total film thickness.

11. The multilayer film according to claim 2, wherein the first layer comprises at least one member selected from the group consisting of homogeneous ethylene/alpha-olefin copolymer, heterogeneous ethylene/alpha-olefin copolymer, high density polyethylene, low density polyethylene, ionomer resin, ethylene/unsaturated ester copolymer, and ethylene/unsaturated acid copolymer.

12. The multilayer film according to claim 11, wherein the third layer comprises at least one member selected from the group consisting of homogeneous ethylene/alpha-olefin copolymer, heterogeneous ethylene/alpha-olefin copolymer, high density polyethylene, low density polyethylene, ionomer resin, ethylene/unsaturated ester copolymer, and ethylene/unsaturated acid copolymer.

13. The multilayer film according to claim 2, wherein the film has a total free shrink at 185° F. of from 15 to 120 percent.

14. The multilayer film according to claim 13, wherein the oxygen transmission rate is from 11,358 to 15,256 cc/m$^2$/day @STP.

15. A heat-shrinkable bag, comprising a multilayer heat-shrinkable film heat sealed to itself or another film, the multilayer film comprising:
(A) a first layer which is a first outer film layer and which serves as a heat seal layer, the first layer comprising a first polymer, the first layer having a thickness of from 2 to 20 percent of a total thickness of the multilayer film; and
(B) at least one second layer which serves as a high oxygen transmission layer, the at least one second layer comprising at least one member selected from the group consisting of:
  (i) ethylene/butyl acrylate copolymer,
  (ii) homogeneous ethylene/alpha-olefin copolymer having a density of from 0.86 to 0.91 g/cc
  a(iii) heterogeneous ethylene/alpha-olefin copolymer having a density of from 0.89 to 0.91 g/cc;
  (iv) ethylene/methyl acrylate copolymer having a methyl acrylate mer content of from 20 to 24 mole percent;
  (v) ethylene/vinyl acetate copolymer having a vinyl acetate mer content of from 10 to 30 mole percent;
  (vi) styrene butadiene block copolymer; and
  the at least one second layer having a thickness of from 80 to 98 percent of the total thickness of the multilayer film;
the total thickness of the multilayer film from about 1.5 mils to about 2.5 mils, and the film having an oxygen transmission rate from about 10,000 to about 15,000 cc/m$^2$/24 hr @STP.

16. The heat-shrinkable bag according to claim 15, wherein the bag exhibits a parallel plate burst strength of at least 30 inches of water.

17. The heat-shrinkable bag according to claim 15, wherein the bag is an end-seal bag.

18. The heat-shrinkable bag according to claim 15, wherein the bag is a side-seal bag.

19. The heat-shrinkable bag according to claim 15, wherein the film has a total free shrink at 185° F. of from 15 to 120 percent.

20. The heat-shrinkable bag according to claim 19, wherein the film has an oxygen transmission rate of from 11,358 to 15,256 cc/m$^2$/day @STP.

21. A packaged product comprising:
(A) a product comprising at least one member selected from the group consisting of seafood and produce;
(B) a package surrounding the product, the package comprising a multilayer film comprising:
  (i) a first layer which is a first outer film layer and which serves as a heat seal layer, the first layer comprising a first polymer, the first layer having a thickness of from 2 to 20 percent of a total thickness of the multilayer film; and (ii) at least one second layer which serves as a high oxygen transmission layer, the at least one second layer comprising at least one member selected from the group consisting of:

(1) ethylene/butyl acrylate copolymer, (2) homogeneous ethylene/alpha-olefin copolymer having a density of from 0.86 to 0.91 g/cc (3) heterogeneous ethylene/alpha-olefin copolymer having a density of from 0.89 to 0.91 g/cc;

(4) ethylene/methyl acrylate copolymer having a methyl acrylate mer content of from 20 to 24 mole percent;

(5) ethylene/vinyl acetate copolymer having a vinyl acetate mer content of from 10 to 30 mole percent;

(6) styrene butadiene block copolymer; and the at least one second layer having a thickness of from 80 to 98 percent of the total thickness of the multilayer film, and the total thickness of the multilayer film being from about 1.5 mils to about 2.5 mils and the film having an oxygen transmission rate from about 10,000 to about 15,000 cc/m$^2$/24 hr @STP.

* * * * *